US012562639B2

(12) United States Patent
Nadarajan et al.

(10) Patent No.: US 12,562,639 B2
(45) Date of Patent: Feb. 24, 2026

(54) POWER ELECTRONICS CONVERTER THERMAL MANAGEMENT

(71) Applicant: ROLLS-ROYCE plc, London (GB)

(72) Inventors: Sivakumar Nadarajan, Singapore (SG); Mohamed Sathik Mohamed Halick, Singapore (SG); Viswanathan Vaiyapuri, Singapore (SG); Sundararajan Prasanth, Singapore (SG); Amit K. Gupta, Singapore (SG)

(73) Assignee: Rolls-Royce PLC, London (GB)

( * ) Notice: Subject to any disclaimer, the term of this patent is extended or adjusted under 35 U.S.C. 154(b) by 291 days.

(21) Appl. No.: 18/512,170

(22) Filed: Nov. 17, 2023

(65) Prior Publication Data

US 2024/0186889 A1 Jun. 6, 2024

(30) Foreign Application Priority Data

Dec. 6, 2022 (GB) ..................................... 2218292

(51) Int. Cl.
| | |
|---|---|
| *H02M 1/32* | (2007.01) |
| *H02M 1/00* | (2006.01) |
| *H02M 7/5387* | (2007.01) |

(52) U.S. Cl.
CPC ......... *H02M 1/327* (2021.05); *H02M 1/0009* (2021.05); *H02M 7/53871* (2013.01)

(58) Field of Classification Search
CPC . H02M 1/327; H02M 1/0009; H02M 7/53871
(Continued)

(56) References Cited

U.S. PATENT DOCUMENTS

| | | | |
|---|---|---|---|
| 11,128,290 B2* | 9/2021 | Aeloiza .................... | H03K 5/24 |
| 2018/0366970 A1 | 12/2018 | Zhou et al. | |

(Continued)

FOREIGN PATENT DOCUMENTS

| | | |
|---|---|---|
| EP | 3086453 A1 | 10/2016 |
| EP | 3422574 A1 | 1/2019 |

(Continued)

OTHER PUBLICATIONS

European search report dated Apr. 10, 2024, issued in EP Patent Application No. 23208827.8.

(Continued)

*Primary Examiner* — Yemane Mehari

(57) ABSTRACT

The disclosure relates to thermal management of a power electronics converter. An example embodiment includes a power electronics converter comprising: a first set of terminals connectable to a first voltage supply; a second set of terminals connectable to a second voltage supply; a plurality of semiconductor switches connected between the first and second sets of terminals; a voltage sensor connected to measure a voltage across the second supply; a current sensor connected to measure a current through the second supply; and a controller connected to provide switching signals to the semiconductor switches and to receive voltage and current signals from the voltage and current sensors, the controller configured, for each of the semiconductor switches, to: determine a junction temperature of the semiconductor switch; compare the determined junction temperature to a reference temperature; and adjust a switching gate voltage applied to the semiconductor switch.

19 Claims, 10 Drawing Sheets

(58) Field of Classification Search
USPC .......................................................... 323/271
See application file for complete search history.

(56) References Cited

U.S. PATENT DOCUMENTS

| | | | |
|---|---|---|---|
| 2019/0131863 A1 | 5/2019 | El Markhi et al. | |
| 2020/0350904 A1* | 11/2020 | Melkonyan ...... | H03K 17/08122 |
| 2021/0028778 A1* | 1/2021 | Aeloiza ............. | H03K 17/0822 |
| 2022/0231599 A1* | 7/2022 | Geske .................... | H02M 1/08 |

FOREIGN PATENT DOCUMENTS

| | | |
|---|---|---|
| EP | 3780375 A1 | 2/2021 |
| GB | 2510658 A | 8/2014 |
| GB | 2541506 A | 2/2017 |
| WO | 2015059735 A1 | 4/2015 |

OTHER PUBLICATIONS

Great Britian search report dated Jun. 6, 2023, issued in GB Patent Application No. 2218292.7.
L. Wei, J. McGuire, and R. A. Lukaszewski, "Analysis of PWM frequency control to improve the lifetime of PWM inverter," IEEE Transactions on Industry Applications, vol. 47, pp. 922-929, 2011.
J. Lemmens, J. Driesen, and p. Vanassche, "Dynamic DC-link voltage adaptation for thermal management of traction drives," in Energy Conversion Congress and Exposition (ECCE), 2013 IEEE, 2013, pp. 180-187.
K. Ma, M. Liserre, and F. Blaabjerg, "Reactive power influence on the thermal cycling of multi-MW wind power inverter," IEEE Transactions on Industry Applications, vol. 49, pp. 922-930, 2013.

* cited by examiner

POWER ELECTRONICS CONVERTER THERMAL MANAGEMENT

CROSS-REFERENCE TO RELATED APPLICATIONS

This specification is based upon and claims the benefit of priority from United Kingdom Patent Application No. 2218292.7, filed 6 Dec. 2022, the entire contents of which are incorporated herein by reference.

BACKGROUND

Technical Field

The disclosure relates to thermal management of power electronics converters, for example to provide overtemperature protection for semiconductor switching components in high power converters.

Description of the Related Art

In aerospace, the more electric engine (MEE) and more electric aircraft (MEA) concepts are seen as being increasingly attractive due to their potential to reduce fuel consumption. Such aircraft generally require a high voltage DC electrical network, operating with a DC bus voltage of for example around 270V or 540V. Power electronics converters are used to convert between the DC supply on the DC electrical network and AC supplies for electrical machines and DC supplies for battery storage. Such converters may be employed in safety critical applications, for example in starter-generators for gas turbine engines, oil pumps, fuel pumps and electrical actuation systems. Safety and reliability of such converters is therefore of critical importance. Power electronics converters may also be used in electrical or hybrid propulsion systems in land or sea applications, in which safety and reliability is also important but where weight may be less of a critical factor.

It is estimated that about a third of the faults in variable speed drive systems are due to failure of the power devices. Inverter failure is critical, especially in aircraft and marine applications. In safety critical applications a premature failure could lead to a complete system shutdown and reduce the reliability of the whole system. These applications therefore usually require proper thermal management systems to ensure protection of power devices from thermal runaway failure.

Despite extensive efforts to improve the reliability of power semiconductor devices, failure of power electronics is still a significant problem. Although wide band-gap power devices (such as SiC and GaN based MOSFET devices) are more rugged than silicon power devices, such devices can still suffer from failure due to the electrical and thermal stresses that occur in many applications, since many power converters are continuously operated with highly inductive loads and with varying operating currents. Failure mechanisms may for example be triggered by CTE (coefficient of thermal expansion) mismatches across material interfaces, resulting in failures such as solder fatigue and bond wire lift-off. CTE mismatches will also tend to weaken IGBT interfaces over time due to repetitive thermal cycling caused by load variations and environmental conditions. Moreover, operating conditions can be more adverse when system thermal management is not optimal, which may eventually trigger power module wear out failures. Therefore, thermal management of power semiconductor devices is an important problem to address.

SUMMARY

According to a first aspect there is provided a power electronics converter comprising:
- a first set of terminals connectable to a first voltage supply;
- a second set of terminals connectable to a second voltage supply;
- a plurality of semiconductor switches connected between the first and second sets of terminals;
- a voltage sensor connected to measure a voltage across the second supply;
- a current sensor connected to measure a current through the second supply; and
- a controller connected to provide switching signals to the semiconductor switches and to receive voltage and current signals from the voltage and current sensors, the controller configured, for each of the semiconductor switches, to:
- determine a junction temperature of the semiconductor switch;
- compare the determined junction temperature to a reference temperature; and
- adjust a switching gate voltage applied to the semiconductor switch to reduce a conduction loss if the determined junction temperature exceeds the reference temperature.

Adjustment of the switching gate voltage to reduce conduction losses allows for thermal stresses to be dynamically managed to reduce or prevent thermal cycling stress failures.

The first voltage supply may be a DC supply and the second voltage supply an AC supply. The second set of terminals may comprise first, second and third terminals, each of the first, second and third terminals connected to a respective node between first, second and third pairs of the plurality of semiconductor switches, each of the first, second and third pairs of the plurality of semiconductor switches connected in series between first and second DC terminals of the DC supply.

The first and second voltage supplies may alternatively be DC voltage supplies.

Each of the plurality of semiconductor switches may comprise a transistor and a reverse-biased diode connected in parallel.

Each transistor may be a bipolar transistor, a power MOSFET or an insulated-gate bipolar transistor (IGBT). The power electronics converter is particularly suitable for wide band gap semiconductor devices such as SiC and GaN based power MOSFETs.

The controller may be configured, for each of the semiconductor switches, to adjust a gate switching frequency applied to the semiconductor switch to reduce a variation in the determined junction temperature if the variation in the determined junction temperature exceeds a reference temperature variation.

The controller may be configured to shut down operation of the semiconductor switches if, after adjusting the switching gate voltage and adjusting the switching gate frequency, the determined junction temperature exceeds the reference temperature.

The controller may comprise:
- a thermal management controller configured to receive voltage and current signals from the voltage and current sensors and determine the junction temperature of each
of the semiconductor switches; and a gate driver controller configured to provide switching
signals to the semiconductor switches.

The thermal management controller may be configured to
determine the junction temperature of each of the semicon-
ductor switches with on a thermal model based on inputs
including the received voltage and current signals and a gate
switching frequency for each of the semiconductor switches.

According to a second aspect there is provided a method
of operating a power electronics converter comprising:

a first set of terminals connected to a first voltage supply;

a second set of terminals connected to a second voltage
supply;

a plurality of semiconductor switches connected between
the first and second sets of terminals;

a voltage sensor connected to measure a voltage across
the second supply;

a current sensor connected to measure a current through
the second supply; and a controller connected to provide switching signals to the
semiconductor switches and to receive voltage and
current signals from the voltage and current sensors,
the method comprising, for each of the semiconductor
switches, the controller:

determining a junction temperature of the semiconductor
switch;

comparing the determined junction temperature to a ref-
erence temperature; and adjusting a switching gate voltage applied to the semi-
conductor switch to reduce a conduction loss if the
determined junction temperature exceeds the reference
temperature.

The controller may adjust a gate switching frequency
applied to the semiconductor switch to reduce a variation in
the determined junction temperature if the variation in the
determined junction temperature exceeds a reference tem-
perature variation.

The controller may shut down operation of the semicon-
ductor switches if, after adjusting the switching gate voltage
and adjusting the switching gate frequency, the determined
junction temperature exceeds the reference temperature.

The controller may comprise:

a thermal management controller configured to receive
voltage and current signals from the voltage and current
sensors and determine the junction temperature of each
of the semiconductor switches; and a gate driver controller configured to provide switching
signals to the semiconductor switches.

The thermal management controller may determine the
junction temperature of each of the semiconductor switches
with a thermal model based on inputs including the received
voltage and current signals and a gate switching frequency
for each of the semiconductor switches.

According to a third aspect there is provided an aircraft
power and propulsion system comprising:

a gas turbine engine; and an electrical power system comprising an electrical
machine and a power electronics converter according to
the first aspect, wherein the electrical machine of the electrical power
system is mechanically coupled with a spool of the gas
turbine engine.

According to a fourth aspect there is provided an aircraft
comprising the power electronics converter of the first
aspect or the power and propulsion system according to the
third aspect. The aircraft may be a hybrid electric aircraft.

The skilled person will appreciate that except where
mutually exclusive, a feature described in relation to any one
of the above aspects may be applied mutatis mutandis to any
other aspect. Furthermore except where mutually exclusive
any feature described herein may be applied to any aspect
and/or combined with any other feature described herein.

DESCRIPTION OF THE DRAWINGS

Embodiments will now be described by way of example
only with reference to the accompanying drawings, which
are purely schematic and not to scale, and in which.

DETAILED DESCRIPTION

FIG. 1

Figure 1:
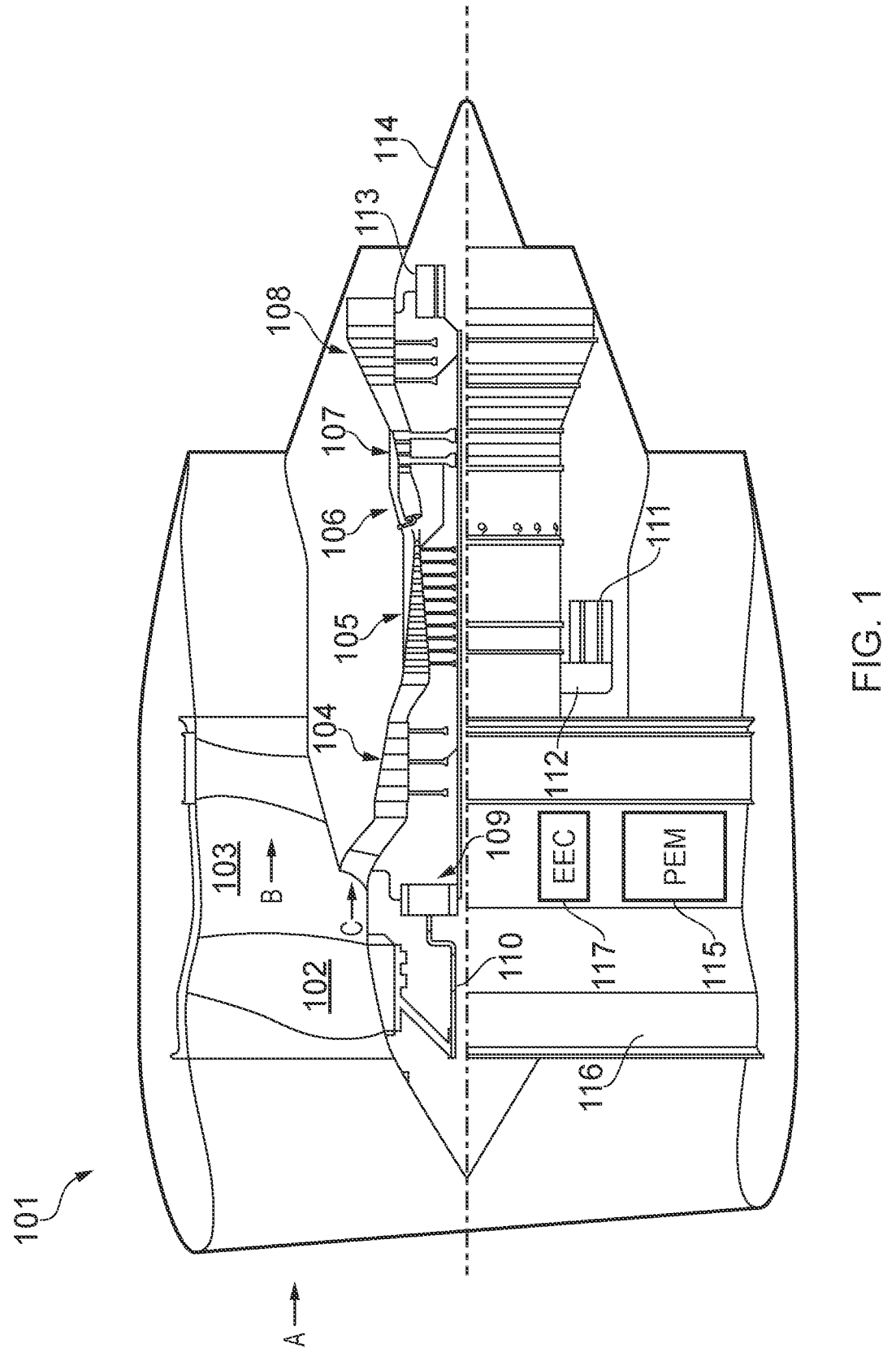
FIG. 1 shows a general arrangement of a turbofan engine
for an aircraft.

A general arrangement of an engine 101 for an aircraft is
shown in FIG. 1. The engine 101 is of turbofan configura-
tion, and thus comprises a ducted fan 102 that receives
intake air A and generates two pressurised airflows: a bypass
flow B which passes axially through a bypass duct 103 and
a core flow C which enters a core gas turbine.

The core gas turbine comprises, in axial flow series, a
low-pressure compressor 104, a high-pressure compressor
105, a combustor 106, a high-pressure turbine 107, and a
low-pressure turbine 108.

In operation, the core flow C is compressed by the
low-pressure compressor 104 and is then directed into the
high-pressure compressor 105 where further compression
takes place. The compressed air exhausted from the high-
pressure compressor 105 is directed into the combustor 106
where it is mixed with fuel and the mixture is combusted.
The resultant hot combustion products then expand through,
and thereby drive, the high-pressure turbine 107 and in turn the low-pressure turbine 108 before being exhausted to provide a small proportion of the overall thrust.

The high-pressure turbine 107 drives the high-pressure compressor 105 via an interconnecting shaft. The low-pressure turbine 108 drives the low-pressure compressor 104 via another interconnecting shaft. Together, the high-pressure compressor 105, high-pressure turbine 107, and associated interconnecting shaft form part of a high-pressure spool of the engine 101. Similarly, the low-pressure compressor 104, low-pressure turbine 108, and associated interconnecting shaft form part of a low-pressure spool of the engine 101. Such nomenclature will be familiar to those skilled in the art. Those skilled in the art will also appreciate that whilst the illustrated engine has two spools, other gas turbine engines have a different number of spools, e.g., three spools.

The fan 102 is driven by the low-pressure turbine 108 via a reduction gearbox in the form of a planetary-configuration epicyclic gearbox 109. Thus in this configuration, the low-pressure turbine 108 is connected with a sun gear of the gearbox 109. The sun gear is meshed with a plurality of planet gears located in a rotating carrier, which planet gears are in turn meshed with a static ring gear. The rotating carrier drives the fan 102 via a fan shaft 110. It will be appreciated that in alternative embodiments a star-configuration epicyclic gearbox (in which the planet carrier is static and the ring gear rotates and provides the output) may be used instead, and indeed that the gearbox 109 may be omitted entirely so that the fan 102 is driven directly by the low-pressure turbine 108.

It is increasingly desirable to facilitate a greater degree of electrical functionality on the airframe and on the engine. To this end, the engine 101 of FIG. 1 comprises one or more rotary electrical machines, generally capable of operating both as a motor and as a generator. The number and arrangement of the rotary electrical machines will depend to some extent on the desired functionality. Some embodiments of the engine 101 include a single rotary electrical machine 111 driven by the high-pressure spool, for example by a core-mounted accessory drive 112 of conventional configuration. Such a configuration facilitates the generation of electrical power for the engine and the aircraft and the driving of the high-pressure spool to facilitate starting of the engine in place of an air turbine starter. Other embodiments, including the one shown in FIG. 1, comprise both a first rotary electrical machine 111 coupled with the high pressure spool and a second rotary electrical machine 113 coupled with the low pressure spool. In addition to generating electrical power and the starting the engine 101, having both first and second rotary machines 111, 113, connected by power electronics, can facilitate the transfer of mechanical power between the high and lower pressure spools to improve operability, fuel consumption etc.

As mentioned above, in FIG. 1 the first rotary electrical machine 111 is driven by the high-pressure spool by a core-mounted accessory drive 112 of conventional configuration. In alternative embodiments, the first electrical machine 111 may be mounted coaxially with the turbomachinery in the engine 101. For example, the first electrical machine 111 may be mounted axially in line with the duct between the low- and high-pressure compressors 104 and 105. In FIG. 1, the second electrical machine 113 is mounted in the tail cone 114 of the engine 101 coaxially with the turbomachinery and is coupled to the low-pressure turbine 108. In alternative embodiments, the second rotary electrical machine 113 may be located axially in line with low-pressure compressor 104, which may adopt a bladed disc or bladed drum configuration to provide space for the second rotary electrical machine 113. It will of course be appreciated by those skilled in the art that any other suitable location for the first and (if present) second electrical machines may be adopted.

The first and second electrical machines 111, 113 are connected with power electronics. Extraction of power from or application of power to the electrical machines is performed by a power electronics module (PEM) 115. In the present embodiment, the PEM 115 is mounted on the fan case 116 of the engine 101, but it will be appreciated that it may be mounted elsewhere such as on the core of the gas turbine, or in the vehicle to which the engine 101 is attached, for example.

Control of the PEM 115 and of the first and second electrical machines 111 and 113 is in the present example performed by an engine electronic controller (EEC) 117. In the present embodiment the EEC 117 is a full-authority digital engine controller (FADEC), the configuration of which will be known and understood by those skilled in the art. It therefore controls all aspects of the engine 101, i.e. both of the core gas turbine and the first and second electrical machines 111 and 113. In this way, the EEC 117 may holistically respond to both thrust demand and electrical power demand.

The one or more rotary electrical machines 111, 113 and the power electronics 115 may be configured to output to or receive electric power from one, two or more dc busses. The dc busses allow for the distribution of electrical power to other engine electrical loads and to electrical loads on the airframe.

Those skilled in the art will appreciate that the gas turbine engine 101 described above may be regarded as a 'more electric' gas turbine engine because of the increased role of the electrical machines 111, 113 compared with those of conventional gas turbines.

Figure 2A:
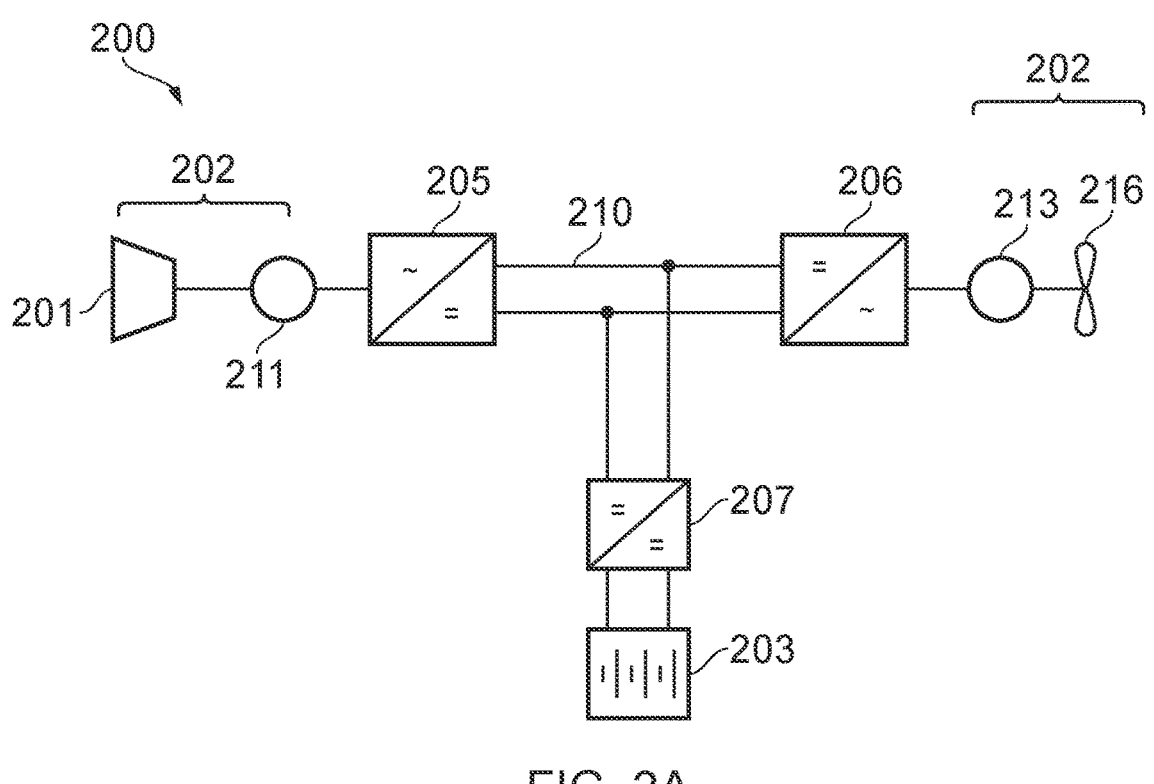
FIG. 2A is a schematic illustration of a hybrid electric
aircraft propulsion system.
Figure 2B:
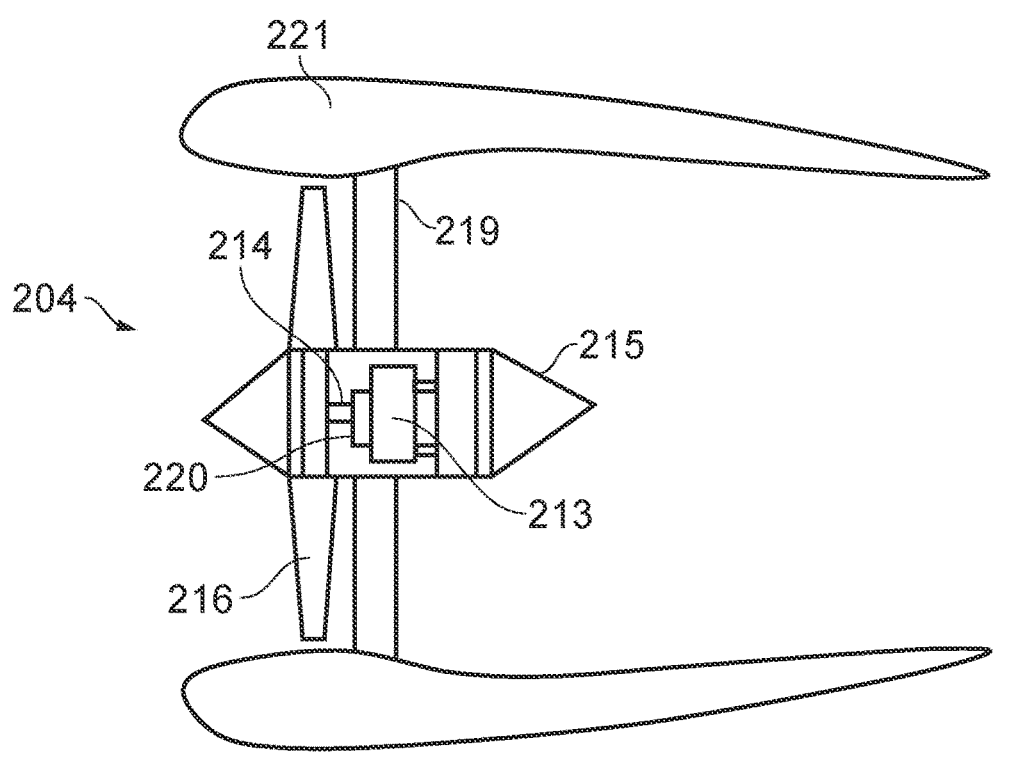
FIG. 2B illustrates an electrically powered propulsor such
as may be used in a hybrid electric propulsion system.

FIGS. 2A and 2B

FIG. 2A illustrates an exemplary propulsion system 200 of a hybrid electric aircraft. The propulsion system 200 includes a generator set 202 comprising a gas turbine engine 201 and electrical generator 211, and a battery pack 203. Both the generator set 202 and the battery pack 203 are used as energy sources to power a motor-driven propulsor 204, an example of which is shown in FIG. 2B.

The illustrated propulsion system 200 further comprises an AC/DC converter 205, a dc distribution bus 210, a DC/AC converter 206 and a DC/DC converter 207. It will be appreciated that whilst one generator set 202 and one propulsor 204 are illustrated in this example, a propulsion system 200 may include more than one generator set 202 and/or one or more propulsor 204.

A shaft or spool of the engine 201 is coupled to and drives the rotation of a shaft of the generator 211 which thereby produces alternating current. The AC/DC converter 205, which faces the generator 211, converts the alternating current into direct current which is fed to various electrical systems and loads via the dc distribution bus 210. These electrical systems include non-propulsive loads (not shown in FIG. 2A) and the motor-driven propulsor 204, which comprises a motor 213 which drives a propulsor 204 via the DC/AC converter 206.

The battery pack 203, which may be made up of a number of battery modules connected in series and/or parallel, is connected to the dc distribution bus 210 via the DC/DC converter 207. The DC/DC converter 207 converts between a voltage of the battery pack 203 and a voltage of the dc distribution bus 210. In this way, the battery pack 203 can replace or supplement the power provided by the generator set 202 (by discharging and thereby feeding the DC distribution bus 210) or can be charged using the power provided by the generator set 202 (by being fed by the dc distribution bus 210).

Referring to FIG. 2B, in this example the propulsor 204 takes the form of a ducted fan. The fan 216 is enclosed within a fan duct 219 defined within a nacelle 221 and is mounted to a core nacelle 215. The fan 216 is driven by the electrical machine 213 via a drive shaft 214, both of which may also be thought of as components of the propulsor 204. In this embodiment a gearbox 220 is provided between the electrical machine 213 and the drive shaft 214.

The electrical machine 213 is supplied with electric power from a power source, for example the generator set 202 and/or the battery 203 via the dc bus 210. The electrical machine 213 of the propulsor, and indeed the electrical machine 211 of the generator set 202, may be of any suitable type, for example of the permanent magnet synchronous type.

Those skilled in the art will recognise the propulsion system 200 of FIGS. 2A-B to be of the series hybrid type. Other hybrid electric propulsion systems are of the parallel type, while still others are of the turboelectric type or have features of more than one type. The configuration of the more electric engine 101 of FIG. 1 may be considered similar to a parallel hybrid system, with the main distinction being the roles of the electrical machines. For example, the electrical machines of a more electric engine are generally only used in motor mode to start the engine and to improve engine operability, whereas the electric machines of a parallel hybrid propulsion system are used to motor the spools to meaningfully add to the amount of propulsive thrust produced by the turbomachinery.

FIG. 3

Figure 3:
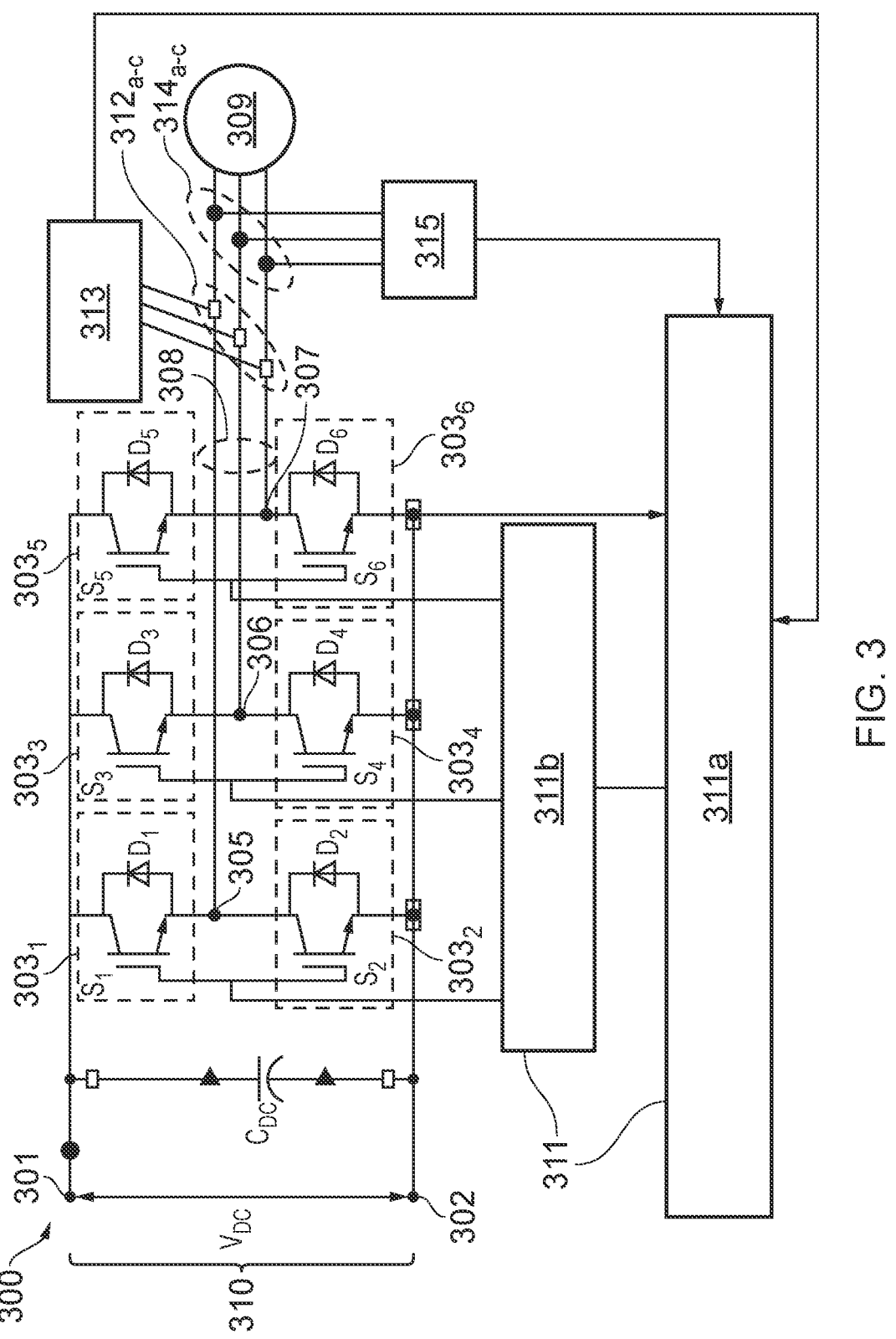
FIG. 3 is a schematic diagram of an example power
electronics converter.

FIG. 3 is a schematic diagram illustrating an example power electronics converter 300. The power electronics converter 300 converts electrical power between a first supply with a DC voltage $V_{DC}$ across first and second DC terminals 301, 302 and a second supply with an AC voltage $V_{AC}$ across AC terminals 305, 306, 307. The converter 300 in this example converts between a three phase AC supply 308 connected to an electrical machine 309 and a DC bus 310 connected to the first and second DC terminals 301, 302.

A plurality of semiconductor switches $303_{1-6}$ is connected between the DC terminals 301, 302 and the AC supply 308. Each semiconductor switch $303_{1-6}$ comprises a transistor $S_1$-$S_6$ connected in parallel with a reverse biased diode $D_1$-$D_6$. The switches $303_{1-6}$ are arranged in series connected pairs, each of a first pair $303_1$, $303_2$, a second pair $303_3$, $303_4$ and a third pair $303_5$, $303_6$ being connected in series between the first and second DC terminals 301, 302. A node 305, 306, 307 between each pair of switches is connected to a respective terminal of the AC supply 308.

Each of the semiconductor switches $303_{1-6}$ comprises a switch transistor $S_{1-6}$ and a reverse-biased diode $D_{1-6}$ connected in parallel. A drain connection of a first one $303_1$, $303_3$, $303_5$ of each pair of semiconductor switches is connected to the first DC terminal 301. A source or emitter connection of the first one $303_1$, $303_3$, $303_5$ of each pair of semiconductor switches and a drain or common connection of a second one $303_2$, $303_4$, $303_6$ of each pair of semiconductor switches is connected to a respective AC terminal 305, 306, 307. A source or emitter connection of the second one $303_2$, $303_4$, $303_6$ of each pair of semiconductor switches is connected to the second DC terminal 302.

The transistor switches $S_{1-6}$ may be bipolar transistors, power MOSFETs or insulated-gate bipolar transistors (IGBTs).

A controller 311 is connected to the switches $303_{1-6}$ to control a switching operation of the switches $303_{1-6}$ to enable the converter to convert between the AC voltage across the AC terminals 305, 306, 307 and a DC voltage $V_{DC}$ across the DC terminals 301, 302. The converter 300 may be operated by the controller 311 to convert an AC voltage at the AC supply 308 to the DC voltage $V_{DC}$ at the DC bus 310 or from the DC voltage $V_{DC}$ to an AC voltage at the AC supply 308, depending on the desired direction of power flow. The electrical machine 309 may operate as an electric generator or motor, either generating or being powered by the AC supply 308. In the illustrated example, the AC supply comprises three phases. In alternative examples a different number of phases may be present.

The gate voltage of each of the switch transistors $S_{1-6}$ is controlled by the controller 311 to control the switching operation of the semiconductor switches $303_{1-6}$.

In the examiner of FIG. 3, the controller 311 comprises two portions, a first portion being a thermal management controller 311a, which may for example be based on a DSP (digital signal processor), and a gate driver controller 311b, which provides the gate voltages at a given switching frequency to the semiconductor switches $303_{1-6}$.

Voltage sensors 312a-c are connected to each of the AC terminals 305, 306, 307, the voltage sensors 312a-c providing voltage signals to a voltage sensing module 313, which provides voltage signals to the thermal management controller 311a. Current sensors 314a-c are also connected to each of the AC terminals 305, 306, 307, the current sensors 314a-c providing current signals to a current sensing module 315, which provided current signals to the thermal management controller 311a.

In alternative examples, the power electronics converter may be a DC:DC converter, i.e. converting between a first DC supply and a second DC supply, which may for example be used between a battery 203 and a DC distribution bus 210 as illustrated in FIG. 2A. Similar principles regarding control of the gate voltages and switching frequencies also apply to DC:DC converters.

Figure 4A:
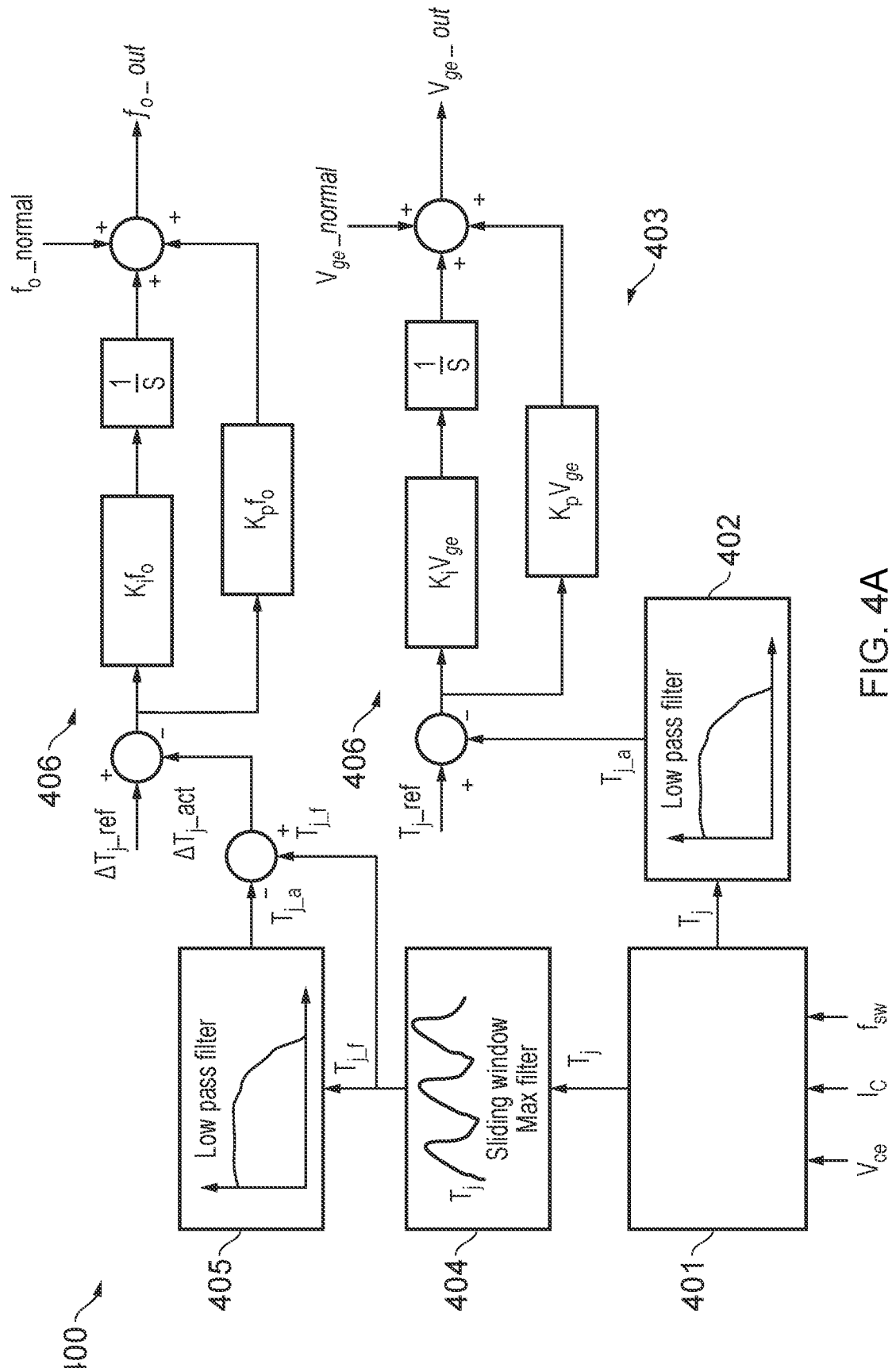
FIG. 4A is a schematic diagram of an example thermal
management controller.
Figure 4B:
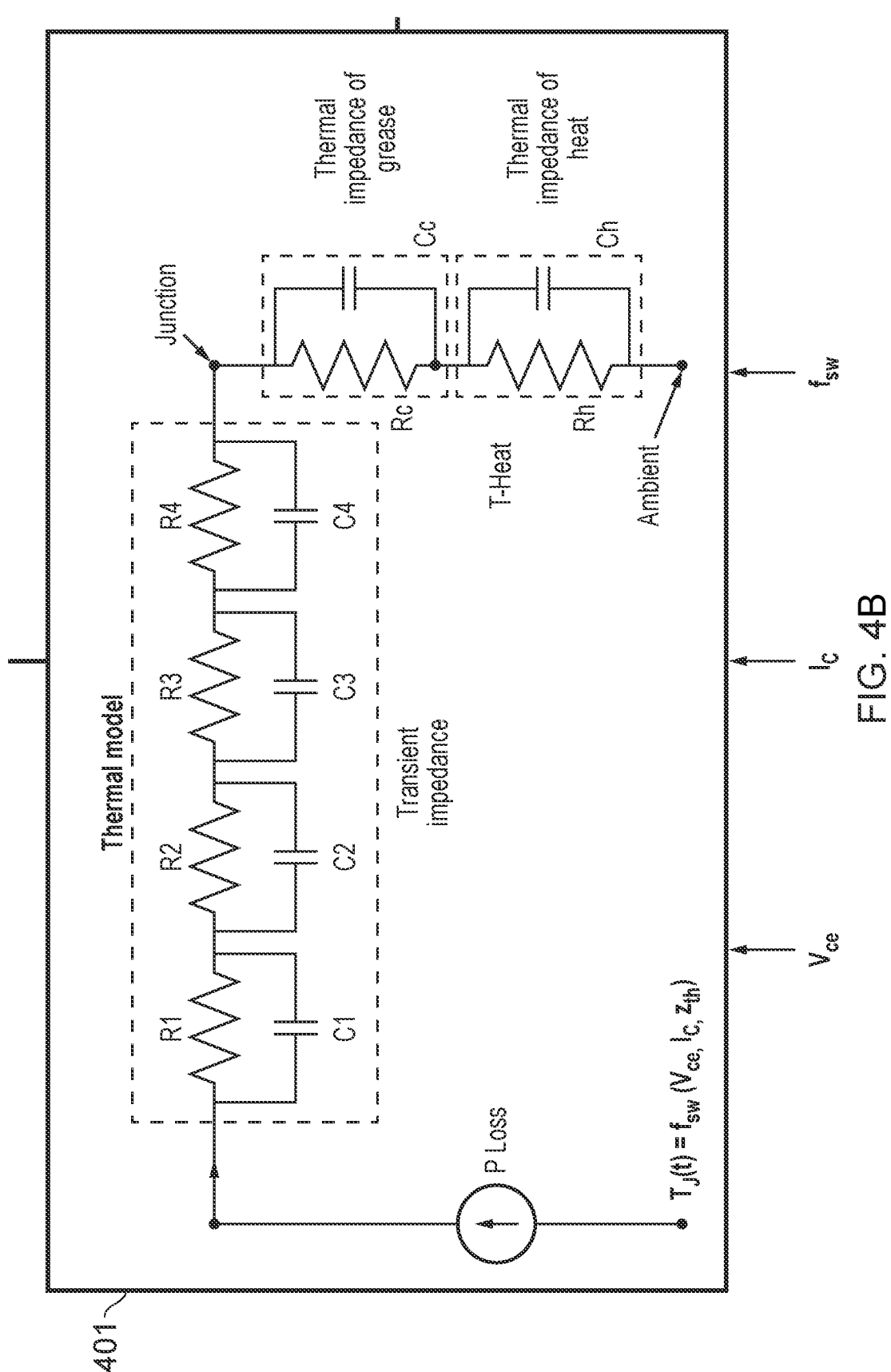
FIG. 4B is a schematic diagram of an example thermal
management controller.

FIGS. 4A and 4B

The gate driver controller 311b provides gate voltages to each of the semiconductor switches $303_{1-6}$ at a gate voltage $V_g$ and switching frequency $f_{SW}$. The gate voltage and switching frequency are determined by the thermal management controller 311a through use of a dynamic thermal controller, an example of which is illustrated in FIG. 4A. The dynamic thermal controller 400 is provided with inputs $V_{CE}$, $I_C$ and $f_{SW}$, i.e. the voltage and current signals and the switching frequency for each of the semiconductor switches $303_{1-6}$ and outputs a gate voltage $V_{ge}$ and an output switching frequency $f_o$ dependent on an estimated junction temperature $T_j$.

An electro-thermal based RC-thermal network model 401 can be used to estimate the junction temperature of a power device (for example a SiC or GaN MOSFET). Such models are simple and feasible for high switching frequency applications. The electro-thermal model consists of two parts: i) a power loss model for the semiconductor device; and ii) an equivalent thermal model to calculate the junction temperature of the power device. The estimated junction temperature is a function of the switching frequency $f_{SW}$, the common-emitter voltage $V_{CE}$ (for a bipolar transistor; the drain-source voltage $V_{DS}$ for a MOSFET), the collector (or source) current $I_C$ and the thermal impedance Zin of the device.

A more detailed example of the thermal model 401 is illustrated in FIG. 4B. The power loss $P_{Loss}$ is modelled as a voltage source and the junction temperature $T_j$ as a voltage at a midpoint node between a first plurality of series connected RC circuits representing a transient impedance and a second plurality of series connected RC circuits representing thermal impedance of grease and heat compared to an ambient temperature. Examples of alternative thermal models for estimating junction temperatures are provided in each of references [1]-[3].

Once the junction temperature $T_j$ is estimated, it is compared with predetermined junction temperature reference value $T_{j\_ref}$. If the junction temperature is less than or equal to the reference value, no change is needed. If, however, the junction temperature is greater than the reference value, the gate voltage controller 311b is instructed to reduce the conduction loss of switching device to limit the junction temperature power modules.

The estimated junction temperature is provided by the thermal model 401 to a first low pass filter 402, which provides a filtered estimated junction temperature $T_{j\_a}$ input to a first control loop 403. The reference temperature $T_{j\_ref}$ is also input to the first control loop 403. The first control loop 403 provides an output gate voltage $V_{ge\_out}$ dependent on a difference between the estimated junction temperature $T_j$ and the reference temperature $T_{j\_ref}$, in this example by adding an amount dependent on the difference to the normal gate voltage $V_{ge\_normal}$.

The estimated junction temperature is also provided by the thermal model 401 to a sliding window filter 404, which outputs a frequency limited version of the estimated junction temperature, $T_{j\_f}$. This is provided to a second low pass filter 405, which outputs a low pass filtered version of the estimated junction temperature, $T_{j\_a}$. The values $T_{j\_f}$ and $T_{j\_a}$ are combined and an estimated temperature variation $DT_{j\_act}$ is provided to a second control loop 406 together with a reference temperature variation $DT_{j\_ref}$. The second control loop 406 outputs a switching frequency $f_{o\_out}$ resulting from the difference between the estimated temperature variation $DT_{j\_act}$ and the reference temperature variation $DT_{j\_ref}$.

FIG. 5

Figure 5:
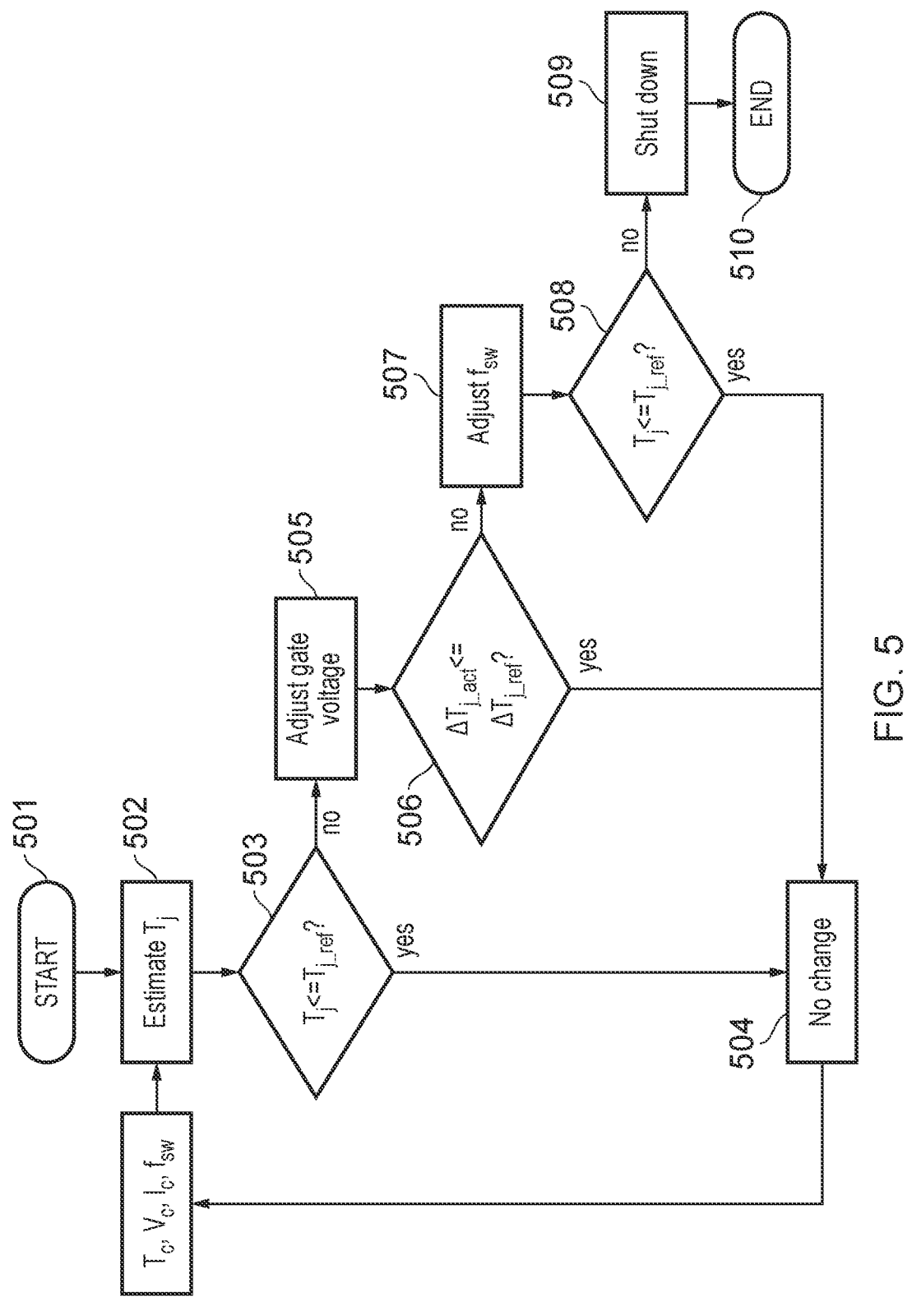
FIG. 5 is a schematic flow diagram illustrating an example
method of operating the converter of FIG. 3.

FIG. 5 is a flow chart illustrating an example method of operating the power electronics converter 300 of FIG. 3 using the thermal management controller of FIGS. 4A and 4B. Upon startup 501, at step 502 the thermal model 401 estimates the junction temperature $T_j$ from inputs $T_c$, $V_c$, $I_c$ and $f_{sw}$. At step 503, the estimated junction temperature $T_j$ is compared with the reference junction temperature $T_{j\_ref}$. If $T_j \leq T_{j\_ref}$, no change is made (step 504) and the process repeats. If, however, $T_j > T_{j\_ref}$, the gate voltage $V_g$ is adjusted (step 505) according to the thermal model described above. If, after adjusting the gate voltage, the estimated junction temperature is still above the reference junction temperature (step 506), the switching frequency is adjusted (step 507) according to the thermal model described above. Otherwise, not change is made (step 504) and the process repeats. If, after adjusting both the gate voltage and the switching frequency, the estimated junction temperature is still above the reference junction temperature (step 508), the controller is shut down (step 509) and the process ends (step 510). Otherwise, no change is made (step 504) and the process repeats. The method may pause before taking action to adjust the gate voltage or switching frequency or before shutting down to allow time for the temperature of the semiconductor switches to respond to any previous changes. A pause may for example be introduced of a few seconds, i.e. between around 1 and 10 s, before proceeding to one or more of steps 502, 505, 507 or 509.

FIG. 6

Figure 6:
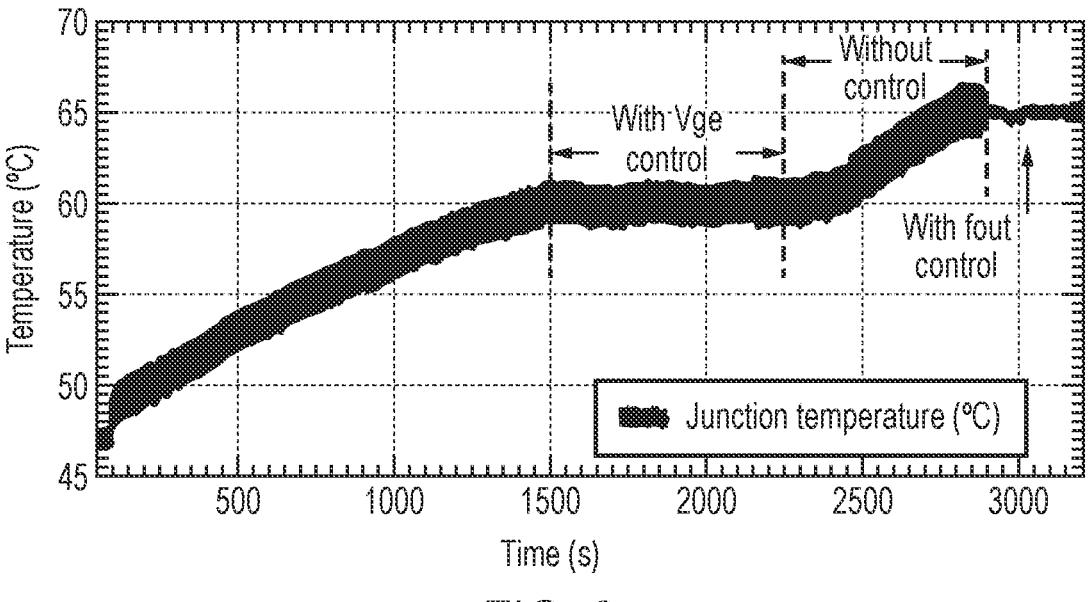
FIG. 6 is a plot of estimated junction temperature over
time during operation of an example power electronics
converter.

FIG. 6 illustrates a plot of the junction temperature of an IGBT module with and without the use of dynamic thermal control as described above. In this example, the initial temperature reference was set at 60° C. The nominal and maximum value of gate voltage was selected as 15-20V. As seen, during the period between around 1500 and 2200 s the dynamic thermal controller was able to maintain the device temperature at around 60° C. through controlling the gate voltage of the IGBT module. When the dynamic thermal controller is turned off, the junction temperature of the IGBT module continues to increase between around 2200 and 2800 s. After this, the dynamic controller is then activated to limit thermal stress due to changes in junction temperature and is able to limit the device change in junction temperature $(\Delta T_j)$ by less than 1° C. through controlling the output frequency of the load current.

In general, the heat capacity or thermal capacity (C) of an object is defined as the ratio between the amount of heat (Q) added to the object to the corresponding temperature change $(\Delta T)$, which is expressed as:

$$C=Q/\Delta T \tag{1}$$

Thus, the change of temperature can be expressed as;

$$\Delta T=Q/C \tag{2}$$

The junction temperature of a power device will vary with respect to the switching signal $(\Delta Tj_{f_s})$ and load current frequency $(\Delta Tj_{f_o})$. Usually, the change in junction temperature due to the switching signal is smaller in magnitude and most of the variations are filtered out by device thermal capacitances. The change in junction temperature due to the load current frequency is larger in magnitude, which is the main cause of thermo-mechanical stress in power devices. Therefore, from equation (2) the change of junction temperature due to output current $(\Delta Tj_{f_o})$ can be expressed as:

$$\Delta Tj_{f_o} = \frac{P_{loss}}{c_{th} \cdot f_{out}} \tag{3}$$

where $f_{out}$ is the output fundamental frequency, $P_{loss}$ is the power loss, and $C_{th}$ is the thermal capacitance. From equation (3), for a constant power dissipation, the change in temperature is inversely proportional to the output fundamental frequency.

FIG. 7

Figure 7:
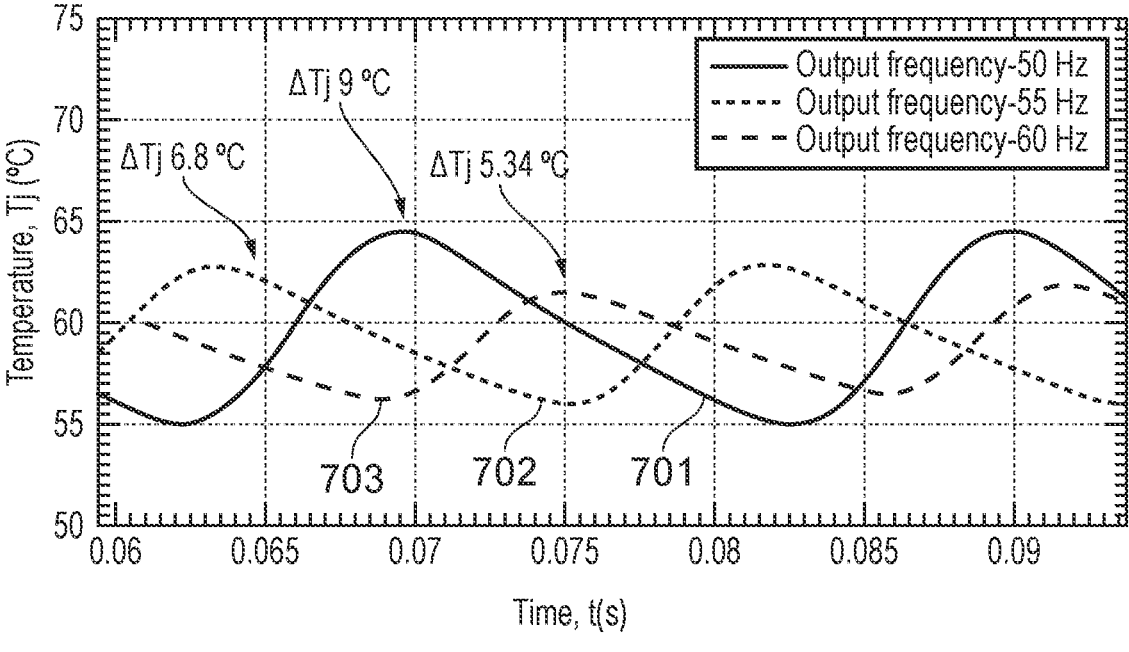
FIG. 7 is a plot of estimated junction temperature over
time during operation of an example power electronics
converter at different output frequencies.

FIG. 7 illustrates a practical verification of junction temperature response with respect to different output frequencies, illustrating the variation in junction temperature 701 at 50 Hz, the junction temperature 702 at 55 Hz and the junction temperature 703 at 60 Hz. The magnitude of temperature swings tends to decrease with an increase in output frequency, with the variation at 60 Hz being 5.34° C. compared to a variation of 9° C. at 50 Hz. The output frequency may therefore be used as a temperature control parameter to influence the change in junction temperature of power devices in transient load conditions. A possible concern of the proposed approach is that an increase in fundamental frequency will affect the maximum torque available to an electrical motor. However, an increase in fundamental frequency of about 10% will not tend to disturb the machine load significantly. Although it will increase the no-load speed and reduce the maximum torque marginally, this can be adjusted by increasing the slip speed. The proposed method has no such restrictions in applications such as two stage dc-dc converters with an intermediate ac link or dual active bridge ac-ac converters, in which there is more freedom to adjust the output frequency of the ac link.

FIG. 8

Figure 8:
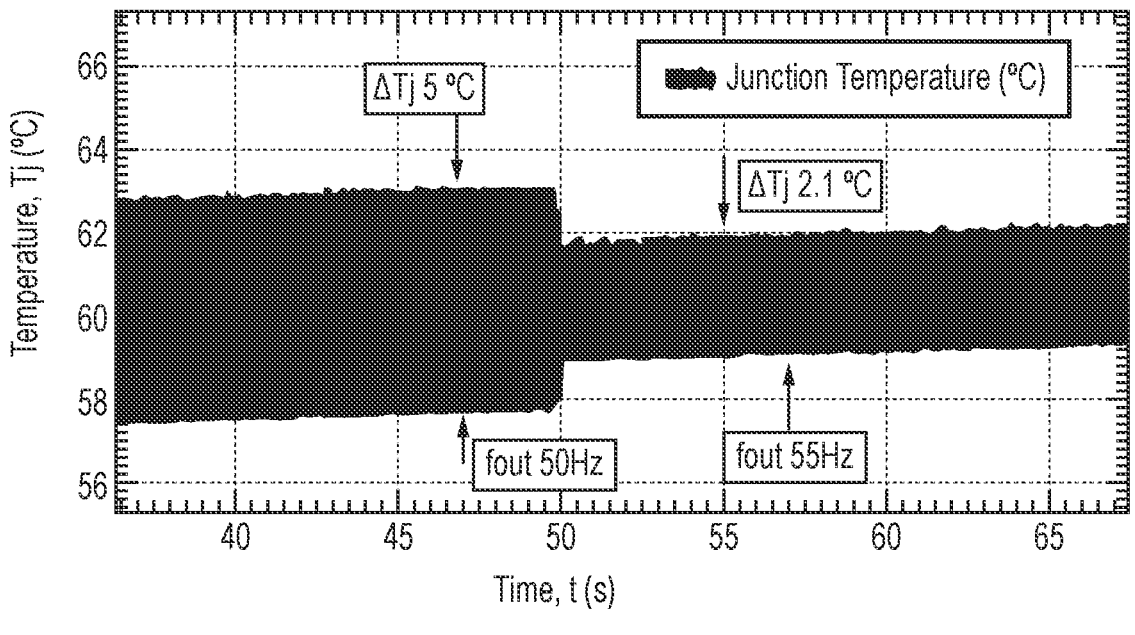
FIG. 8 is a plot of estimated junction temperature over
time during operation of an example power electronics
converter with a change in output frequency.

The proposed output frequency control method uses a closed loop controller, in which the reference change in junction temperature $DT_{j\_ref}$ is compared with the actual change in junction temperature $DT_{j\_act}$. The controller 311 (FIG. 3) is activated once the device temperature swing exceeds the reference device thermal cycling stress limit. The output frequency can then be used to control the variation in junction temperature of the power devices. For functional validation, an example threshold delta temperature reference was set to 5° C. The nominal and maximum output frequencies were selected as 50 Hz and 55 Hz respectively. FIG. 8 shows an experimental result demonstrating the ability of the output frequency controller to limit and maintain the device temperature variation to within around 2.1° C.

FIG. 9

Figure 9:
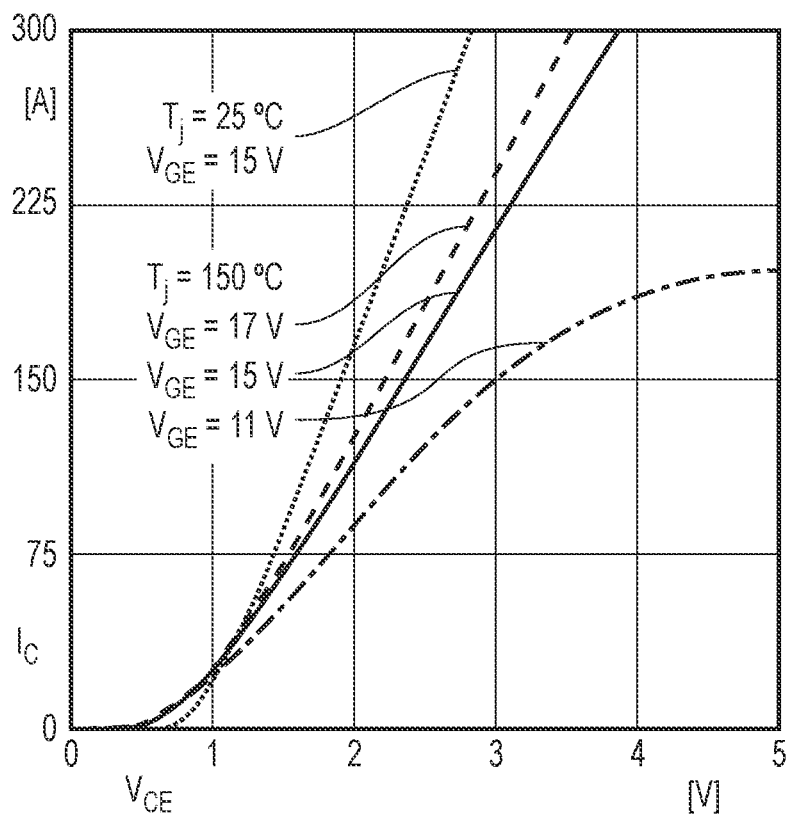
FIG. 9 is a plot of current against voltage illustrating
typical output characteristics of an IGBT device.

FIG. 9 illustrates the typical output characteristics of an IGBT. This indicates that the gate voltage has the strongest relationship with the device current and device voltage. It should be noted that, when the gate voltage is increased, the device on-state voltage $V_{CE}$ decreases (represented by different curve lines showing different gate voltages), which leads to a reduction in conduction loss. Hence, in the context of the thermal controller, it is proposed to use the gate voltage to control the conduction power loss and thereby control the temperature rise.

FIG. 10

Figure 10:
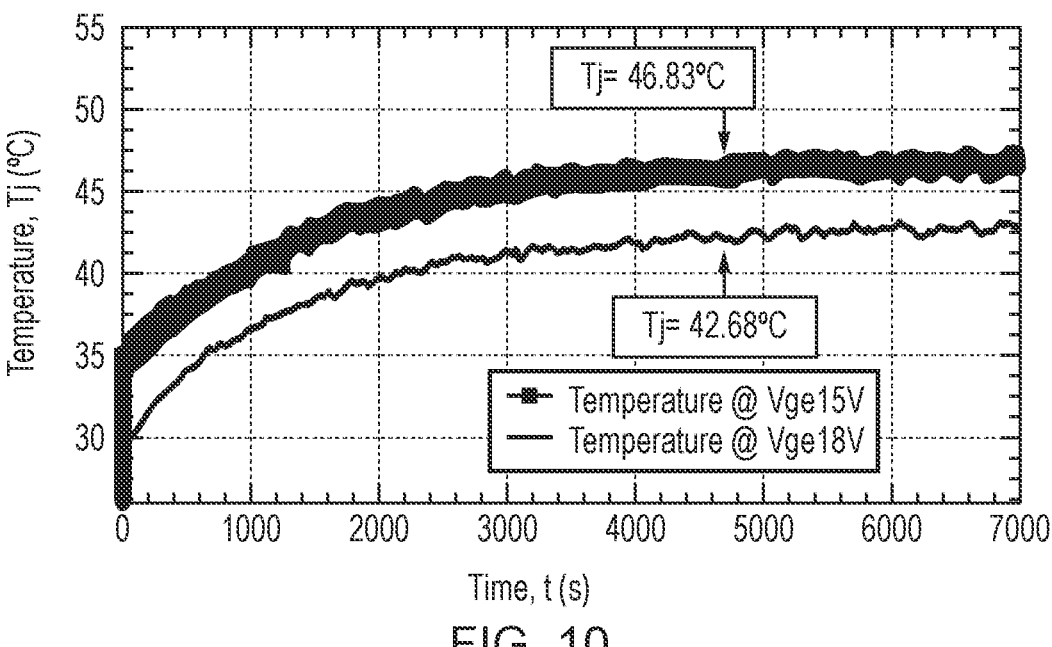
FIG. 10 is a plot of estimated junction temperature over
time with different gate-emitter voltages applied.

FIG. 10 shows the junction temperature response of two different gate-emitter voltages ($V_{GE}$) in a DC-to-DC converter. For practical verification, the nominal and maximum gate-emitter voltages are selected as 15V and 18V respectively. As can be observed, the increase in gate-emitter voltage ($V_{GE}$) will decrease the junction temperature ($T_j$) of a power device. Therefore, the gate voltage is proposed herein as a temperature-related parameter to limit the junction temperature rise of a power device. A possible concern of this approach is that the increase in gate voltage above the standard limit will upsurge the gate charge, resulting in higher collector-current change rate $$\left(\frac{d_{ic}}{dt}\right)\dots$$

FIG. 11

Figure 11:
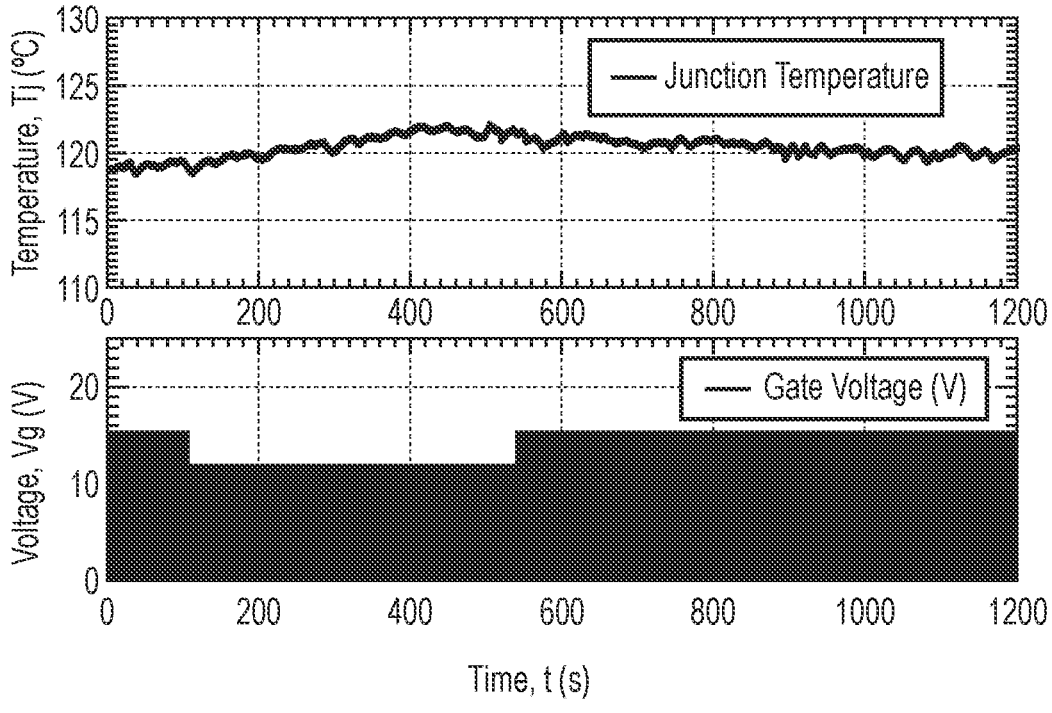
FIG. 11 are plots of estimated junction temperature over
time and a corresponding gate-emitter voltage over time.
Figure 12:
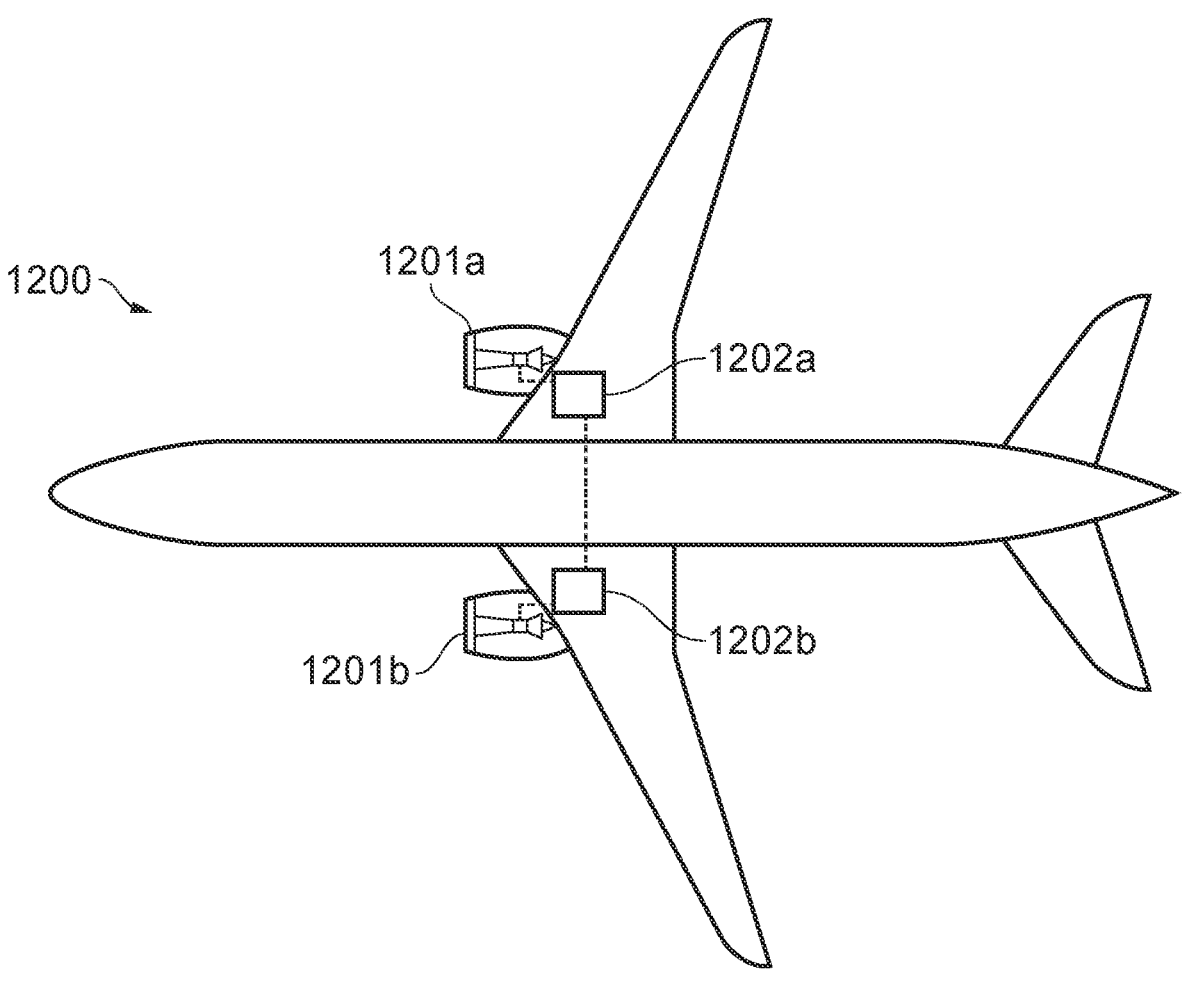
FIG. 12 is a schematic drawing of an example aircraft
comprising gas turbine engines and electrical power sys-
tems.

To investigate the proposed gate voltage control, a chopper experimental test setup was developed. The proposed gate voltage control uses a closed loop controller, where the reference junction temperature is compared with the actual junction temperature. The controller is activated once the device temperature exceeds a reference device temperature. Generally, the gate voltage can be safely varied between 10-18 V. As a standard practice 15 V is used. Hence, in this context to verify the concept, the gate voltage is changed from 10V to 12V and the observed temperature variation is plotted in FIG. 11. Note that during the voltage change, the load current is kept constant, indicating that only the device conduction loss has varied. It can be observed that the frequency controller is able to control and maintain the device junction temperature by controlling the switching frequency.

An advantage of the converter and methods described herein is in increased reliability and increased utilization of silicon thermal capacity by providing sustained operation even under maximum performance limits. A further advantage is that a user can be alerted when the devices are operated above predetermine junction temperature. Excessive thermal stresses, which reduces device lifetime and causes premature failures, can be reduced or prevented The proposed arrangements and method can be applied across a number of applications that use power electronics devices such as IGBT, MOSFET etc and devices manufactured from different material such as Si, SiC, GaN etc. The proposed solution is applicable to both low and high power systems that employ power switches and use high switching frequencies for control. This includes motor drives, power converters, inverters and chopper drives, for example.

Developed junction temperature estimation methods would allow the health monitoring of device and improve the reliability and maintainability of the power electronics converters. Specifically, the knowledge of junction temperature can be used to protect the device and allow safe shutdown when the device temperature goes excessively high.

The type of converter described herein can be further improved by combining it with a cooling system for the power inverter. If the cooling system is developed to have active control, the temperature of the heat sink can be controlled dynamically. Although the response time of cooling systems may be slower, the solution may be effective under steady state condition where load shedding or frequency changes are not required. The present disclosure can be extended to improve the performance of the active cooling system during transient conditions, where it would act as a ride-through system. Hence there is scope to dramatically improve system robustness, particularly under transient conditions.

The life cycle of power devices may be increased by appropriately controlling the gate voltage and output frequency to control device thermal cycling. Here, the same topologies can be used to increase the power loss and heat the devices or reduce the power loss and cool the devices. By appropriate active control of cooling and heating of the power device, drastic thermal transients can be controlled, which will improve the life cycle of the power modules. This can also help to reduce the system size and weight (hence cost) by appropriately designing and selecting suitable components and eliminating the need of over rating and sizing.

Modification to modulation techniques (for example continuous and discontinuous modulation) may be used in the inverter applications, such that conduction losses and switching losses can be distributed from among the power switches. This may be particularly useful to reduce the power loss at a "troubled switch" with excessively large junction temperature. This will require appropriate selection of the switching sequence to minimize the number of switching events or turn on duration at the "troubled switch", hence transferring part of the power loss to other "healthy switches" in the inverter.

Ongoing requirements for civil and defense aircrafts are growing and driving the need for More Electric Aircraft (MEA). Advances in power electronics and electrical machines have permitted the use of Electric Starter Generators (ESGs) coupled to gas turbine engines. Such applications require fault tolerant power systems for improved robustness and reliability. The converter and methods described herein could be used to reduce system weight by reducing the need for over designed architectures. The use of converters and methods described herein may also extend to marine and energy applications, including for example subsea tidal systems, as part of a protection system for improved reliability.

FIG. 12

As described above, the electrical power system described herein may be part of an aircraft power and propulsion system. The aircraft 1200 comprises gas turbine engines 1201a, 1201b, one or both of which may comprise or be connected to an electrical power system 1202a, 1202b of the type as described above. Each of the gas turbine engines 1201a, 1201b may be as described above in relation to FIG. 1. The aircraft 1200 may be a hybrid electric aircraft.

Various examples have been described, each of which feature various combinations of features. It will be appreciated by those skilled in the art that, except where clearly mutually exclusive, any of the features may be employed separately or in combination with any other features and the invention extends to and includes all combinations and sub-combinations of one or more features described herein.

It will also be appreciated that whilst the invention has been described with reference to aircraft and aircraft propulsion systems, the electric machine drive techniques described herein could be used for many other applications. These include, but are not limited to, automotive, marine and land-based applications.

REFERENCES

[1]. L. Wei, J. McGuire, and R. A. Lukaszewski, "Analysis of PWM frequency control to improve the lifetime of PWM inverter," IEEE Transactions on Industry Applications, vol. 47, pp. 922-929, 2011.

[2] J. Lemmens, J. Driesen, and P. Vanassche, "Dynamic DC-link voltage adaptation for thermal management of traction drives," in Energy Conversion Congress and Exposition (ECCE), 2013 IEEE, 2013, pp. 180-187.

[3] K. Ma, M. Liserre, and F. Blaabjerg, "Reactive power influence on the thermal cycling of multi-MW wind power inverter," IEEE Transactions on Industry Applications, vol. 49, pp. 922-930, 2013.

The invention claimed is:

1. A power electronics converter comprising:
a first set of terminals connectable to a first voltage supply;
a second set of terminals connectable to a second voltage supply;
a plurality of semiconductor switches connected between the first and second sets of terminals;
a voltage sensor connected to measure a voltage across the second supply;
a current sensor connected to measure a current through the second supply; and
a controller connected to provide switching signals to the semiconductor switches and to receive voltage and current signals from the voltage and current sensors, the controller configured, for each of the semiconductor switches, to:
determine a junction temperature of the semiconductor switch;
compare the determined junction temperature to a reference temperature; and
adjust a switching gate voltage applied to the semiconductor switch to reduce a conduction loss if the determined junction temperature exceeds the reference temperature.

2. The power electronics converter of claim 1, wherein the first voltage supply is a DC supply and the second voltage supply is an AC supply.

3. The power electronics converter of claim 2, wherein the second set of terminals comprises first, second and third terminals, each of the first, second and third terminals connected to a respective node between first, second and third pairs of the plurality of semiconductor switches, each of the first, second and third pairs of the plurality of semiconductor switches connected in series between first and second DC terminals of the DC supply.

4. The power electronics converter of claim 1, wherein the first and second voltage supplies are DC voltage supplies.

5. The power electronics converter of claim 1, wherein each of the plurality of semiconductor switches comprises a transistor and a reverse-biased diode connected in parallel.

6. The power electronics converter of claim 5, wherein each transistor is a bipolar transistor, a power MOSFET or an insulated-gate bipolar transistor, IGBT.

7. The power electronics converter of claim 6, wherein each transistor is a SiC- or GaN-based power MOSFET.

8. The power electronics converter of claim 1, wherein the controller is configured, for each of the semiconductor switches, to adjust a gate switching frequency applied to the semiconductor switch to reduce a variation in the determined junction temperature if the variation in the determined junction temperature exceeds a reference temperature variation.

9. The power electronics converter of claim 8, wherein the controller is configured to shut down operation of the semiconductor switches if, after adjusting the switching gate voltage and adjusting the switching gate frequency, the determined junction temperature exceeds the reference temperature.

10. The power electronics converter of claim 1, wherein the controller comprises:
a thermal management controller configured to receive voltage and current signals from the voltage and current sensors and determine the junction temperature of each of the semiconductor switches; and
a gate driver controller configured to provide switching signals to the semiconductor switches.

11. The power electronics converter of claim 10, wherein the thermal management controller is configured to determine the junction temperature of each of the semiconductor switches with on a thermal model based on inputs including the received voltage and current signals and a gate switching frequency for each of the semiconductor switches.

12. A method of operating a power electronics converter comprising:
a first set of terminals connected to a first voltage supply;
a second set of terminals connected to a second voltage supply;
a plurality of semiconductor switches connected between the first and second sets of terminals;
a voltage sensor connected to measure a voltage across the second supply;
a current sensor connected to measure a current through the second supply; and
a controller connected to provide switching signals to the semiconductor switches and to receive voltage and current signals from the voltage and current sensors,
the method comprising, for each of the semiconductor switches, the controller:
determining a junction temperature of the semiconductor switch;

comparing the determined junction temperature to a reference temperature; and adjusting a switching gate voltage applied to the semiconductor switch to reduce a conduction loss if the determined junction temperature exceeds the reference temperature.

13. The method of claim 12, wherein the controller adjusts a gate switching frequency applied to the semiconductor switch to reduce a variation in the determined junction temperature if the variation in the determined junction temperature exceeds a reference temperature variation.

14. The method of claim 13, wherein the controller shuts down operation of the semiconductor switches if, after adjusting the switching gate voltage and adjusting the switching gate frequency, the determined junction temperature exceeds the reference temperature.

15. The method of claim 12, wherein the controller comprises:

a thermal management controller configured to receive voltage and current signals from the voltage and current sensors and determine the junction temperature of each of the semiconductor switches; and a gate driver controller configured to provide switching signals to the semiconductor switches.

16. The method of claim 15, wherein the thermal management controller determines the junction temperature of each of the semiconductor switches with a thermal model based on inputs including the received voltage and current signals and a gate switching frequency for each of the semiconductor switches.

17. An aircraft power and propulsion system comprising:

a gas turbine engine; and an electrical power system comprising an electrical machine and a power electronics converter according to claim 1, wherein the electrical machine of the electrical power system is mechanically coupled with a spool of the gas turbine engine.

18. An aircraft comprising the power electronics converter according to claim 1.

19. The aircraft of claim 18, wherein the aircraft is a hybrid electric aircraft.

* * * * *